US012709921B2

(12) United States Patent
Savant et al.

(10) Patent No.: US 12,709,921 B2
(45) Date of Patent: Aug. 18, 2026

(54) VEHICLE DOOR HANDLE ASSEMBLY AND ASSOCIATED VEHICLE DOOR

(71) Applicant: MINEBEA ACCESSSOLUTIONS ITALIA S.P.A., Pianezza (IT)

(72) Inventors: Marco Savant, Pianezza (IT); Alexandre Pieri, Pianezza (IT); Luca Balzarini, Pianezza (IT); Andreas Winter, Pianezza (IT); Martin Winker, Pianezza (IT)

(73) Assignee: MINEBEA ACCESSSOLUTIONS ITALIA S.P.A., Pianezza (IT)

( * ) Notice: Subject to any disclaimer, the term of this patent is extended or adjusted under 35 U.S.C. 154(b) by 34 days.

(21) Appl. No.: 18/754,269

(22) Filed: Jun. 26, 2024

(65) Prior Publication Data

US 2025/0003264 A1 Jan. 2, 2025

(30) Foreign Application Priority Data

Jun. 30, 2023 (EP) .................................... 23182895

(51) Int. Cl.
*E05B 81/76* (2014.01)
*E05B 83/18* (2014.01)

(52) U.S. Cl.
CPC .............. *E05B 81/76* (2013.01); *E05B 83/18* (2013.01)

(58) Field of Classification Search
CPC .......... E05B 81/76; E05B 81/77; E05B 79/04; E05B 83/18; E05B 85/103; E05B 77/38
See application file for complete search history.

(56) References Cited

U.S. PATENT DOCUMENTS

2003/0218356 A1* 11/2003 Emerling ............... B60J 5/0418 296/146.1
2010/0072050 A1* 3/2010 Kubota ................... E05B 83/16 200/341
2017/0306662 A1* 10/2017 Och ...................... E05B 1/0038
2022/0328261 A1 10/2022 Buschmann et al.
(Continued)

FOREIGN PATENT DOCUMENTS

EP 1 361 325 B1 2/2005

OTHER PUBLICATIONS

Extended European Search Report issued Jan. 8, 2024 in European Application 23182895.5 filed on Jun. 30, 2023, 8 pages (with Written Opinion).

*Primary Examiner* — Kristina R Fulton
*Assistant Examiner* — Emily G. Brown
(74) *Attorney, Agent, or Firm* — Oblon, McClelland, Maier & Neustadt, L.L.P.

(57) ABSTRACT

A vehicle door handle assembly includes: a housing providing a recess with an opening; an elastic lever arranged in the recess, having a first end embedded in the housing and a second free end extending in front of the opening; a sensor for detecting a deformation of the elastic lever or a displacement of the second free end of the elastic lever; and a fixing structure arranged around the housing to be fastened to an inner side of a vehicle door panel. The second end of the elastic lever can be in contact with a pin attached to the inner side of the vehicle door panel in front of an outer side location associated with an opening actuation area so that a pressure applied on the opening actuation area leads to a displacement of the second end of the elastic lever which can be detected by the sensor.

13 Claims, 5 Drawing Sheets

(56) References Cited

U.S. PATENT DOCUMENTS

| | | | | |
|---|---|---|---|---|
| 2022/0328263 | A1 * | 10/2022 | Buschmann ............. | G05G 1/02 |
| 2022/0336162 | A1 | 10/2022 | Boczek et al. | |
| 2023/0067991 | A1 * | 3/2023 | Takizawa ................ | E05B 81/66 |
| 2024/0413823 | A1 * | 12/2024 | Mensch .................... | G01L 5/22 |

* cited by examiner

VEHICLE DOOR HANDLE ASSEMBLY AND ASSOCIATED VEHICLE DOOR

TECHNICAL FIELD

The present invention relates to the field of vehicle door handles to control the opening of vehicle doors and in particular to a door handle assembly adapted for a trunk such as a trunk door or a trunk lid.

BACKGROUND OF THE INVENTION

It becomes more and more popular to have door opening actuation means that are hidden from the user's view or integrated in other equipments or parts of the vehicle.

One way to achieve such goal is to use optical means configured for detecting a predetermined move of a user leading to the opening of the trunk. Such solution is usually expensive as it requires optical detection means and associated processing means to analyse the signal provided by the optical detection means.

Another solution is to integrate the door opening mechanism such as a rotating door handle in a brand logo, or a membrane that need to be pushed for the activation. Almost all of these concepts are using mechanical switches to that need to be pressed with one travel that the end user will feel.

However, such solutions may be costly or may be bulky.

It is therefore an aim of the present invention to provide a vehicle door opening assembly that is hidden in the design of the vehicle door and which is cheap and easy to implement on the door or on the trunk.

SUMMARY OF THE INVENTION

The present invention refers to a vehicle door opening assembly comprising:

- a housing providing a recess with an opening,
- an elastic lever arranged in the recess, having a first end embedded in the housing and a second free end extending in front of the opening,
- a sensor configured for detecting a deformation of the elastic lever or a displacement of the second free end of the elastic lever,
- fixing means arranged around the housing and configured to be fastened to an inner side of a vehicle door panel, wherein the second end of the elastic lever is configured to be in contact with a pin attached to the inner side of the vehicle door panel in front of an outer side location associated with an opening actuation area so that a pressure applied on the opening actuation area leads to a displacement of the second end of the elastic lever which can be detected by the sensor.

The use of an elastic lever and an associated sensor configured for detecting a deformation or a displacement of the elastic lever enables detecting the application of a pressure applied on an opening actuation area arranged on a vehicle door.

According to another aspect of the present invention, the vehicle door panel is a trunk door panel or a trunk lid panel.

According to another aspect of the present invention, the elastic lever is a metallic plate.

According to another aspect of the present invention, the fixing means comprise elastic parts configured to be compressed when pressure is applied to the opening actuation area.

According to another aspect of the present invention, the sensor comprises at least one strain gauge arranged on the elastic lever and configured to be deformed when the second free end of the elastic lever is displaced.

According to another aspect of the present invention, the sensor comprises a capacitive, inductive or piezoelectric sensor configured for detecting a displacement of the second free end of the elastic lever.

According to another aspect of the present invention, the fixing means are arranged on a bracket comprising a central frame configured for receiving the housing and a plurality of legs extending around the central frame.

The present invention also refers to a vehicle door comprising a vehicle door opening assembly as described previously wherein the vehicle door also comprises a pin arranged on the inner side of the vehicle door panel and wherein the elastic lever is configured for being preloaded by the pin.

According to another aspect of the present invention, the vehicle door comprises a vehicle door panel, an opening arranged in the vehicle door panel, a cover fastened to the vehicle door panel configured for covering the opening wherein the fastening means are fastened to an inner side of the said vehicle door panel, the cover corresponding to the opening actuation area.

According to another aspect of the present invention, the cover is a brand logo.

According to another aspect of the present invention, elastic means are combined with the fastening means to allow a displacement of the cover with respect to the vehicle door panel.

According to another aspect of the present invention, the cover is made of an elastic material different than the material of the vehicle door panel.

DETAILED DESCRIPTION OF THE INVENTION

The following achievements are examples. Although, the specification refers to one or several embodiments, it does not imply that each reference refers to the same embodiment or that the features apply only to a single embodiment. Simple features of different embodiments can also be combined to provide other embodiments.

In the following of the description, the terms up, upper, low, lower, vertical, horizontal refers to relative positions or directions when the door handle is assembled to a vehicle.

The present invention refers to a vehicle door handle assembly and notably a vehicle door handle assembly adapted for a trunk such as a trunk door or a trunk lid.

Figure 1:
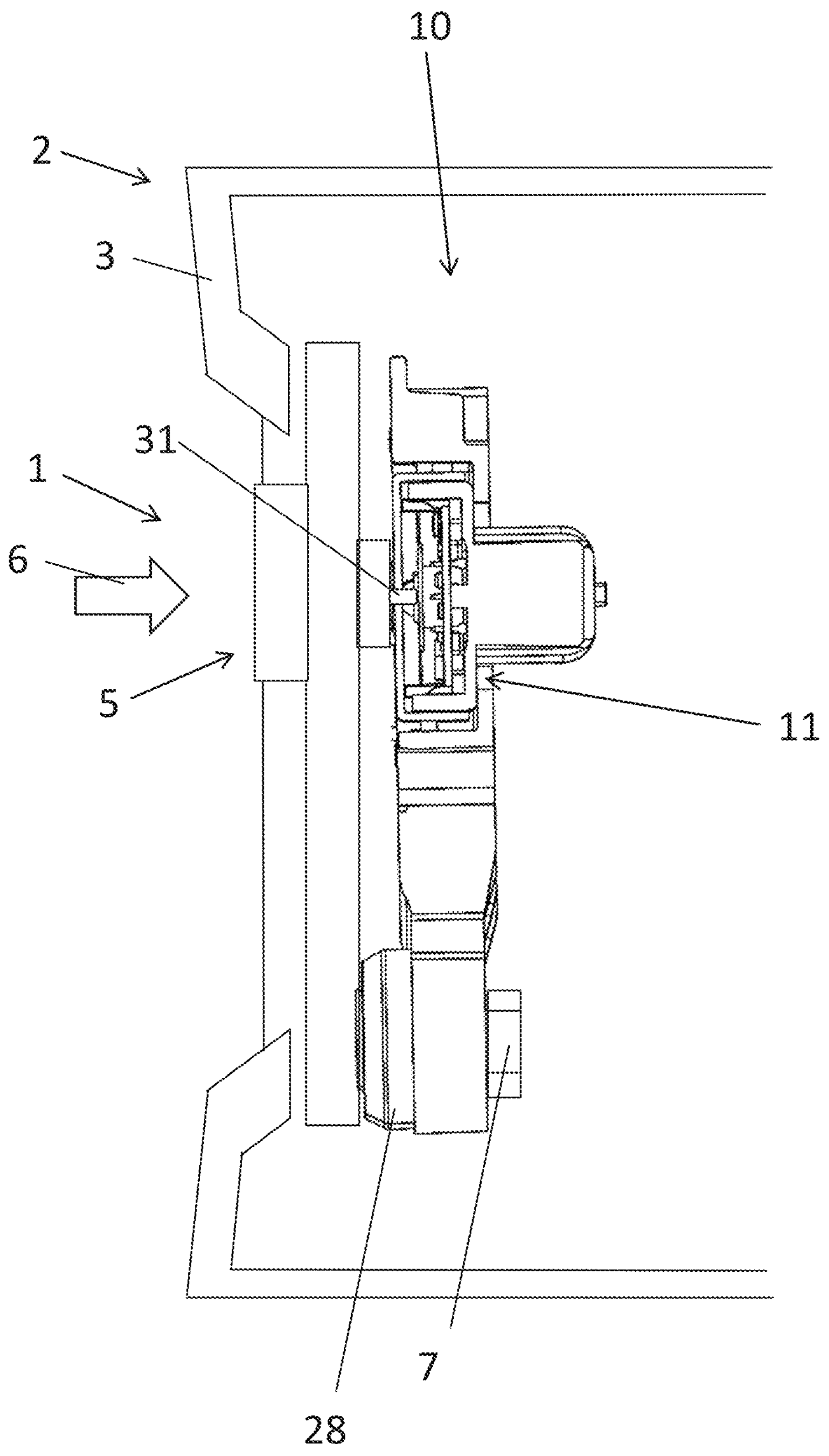
FIG. 1 is a cut view of a portion of a trunk comprising a vehicle door assembly according to an embodiment of the present invention.

FIG. 1 represents a side and cut view of a portion of a trunk door 2 comprising such door handle assembly 10.

In the embodiment of FIG. 1, an opening 1 is arranged in the vehicle door panel 3. The opening may have different sizes or shapes. A cover 5 is positioned in the opening and is fastened to the vehicle door panel 3. The fastening means, for example screws 7, are positioned on an inner side of the vehicle door panel 3 and are not visible from the outside of the vehicle door panel 3. Furthermore, elastic elements 28 such elastomer dampers or springs, may be associated with the fastening means to allow a small displacement of the cover 5 with respect to the vehicle door panel 3 upon pressure of a user. Alternatively, the cover 5 may be flexible enough to allow its own flexion upon pressure of a user. The cover 5 may be a brand logo of the car manufacturer. The cover 5 may be made of a material different than the material of the vehicle door panel 3. The cover 5 is for example made of plastic material. The cover 5 defines an opening actuation area configured to be pushed by the user to open the vehicle door 2, the trunk in the present case.

Alternatively, the opening actuation area may be defined by a portion of the door panel 3 which is flexible enough to allow an elastic displacement over a few millimeters towards the inner side of the vehicle door 2.

Figure 2:
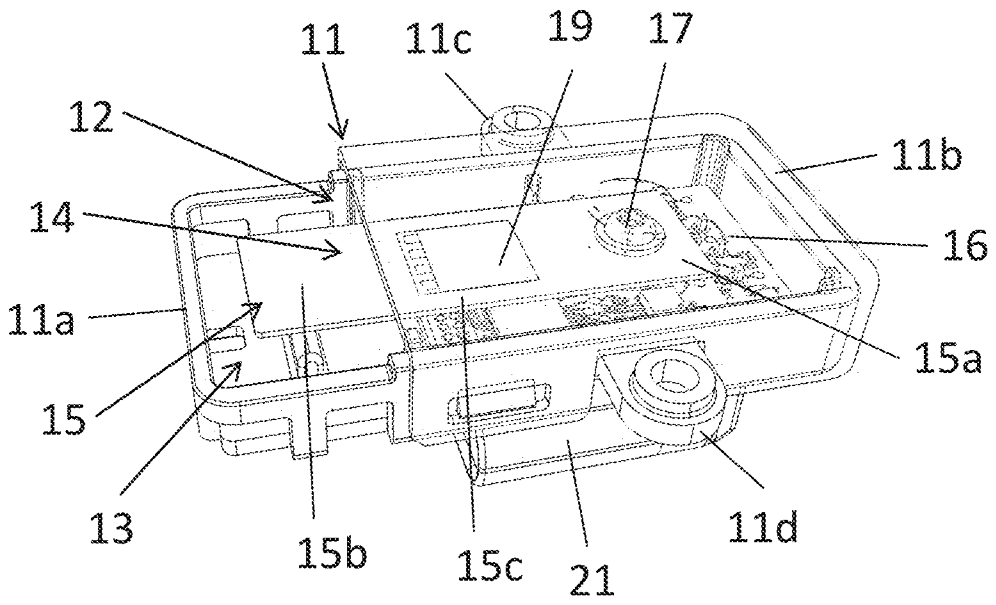
FIG. 2 is a first perspective view of a housing of the vehicle door assembly of FIG. 1.
Figure 3:
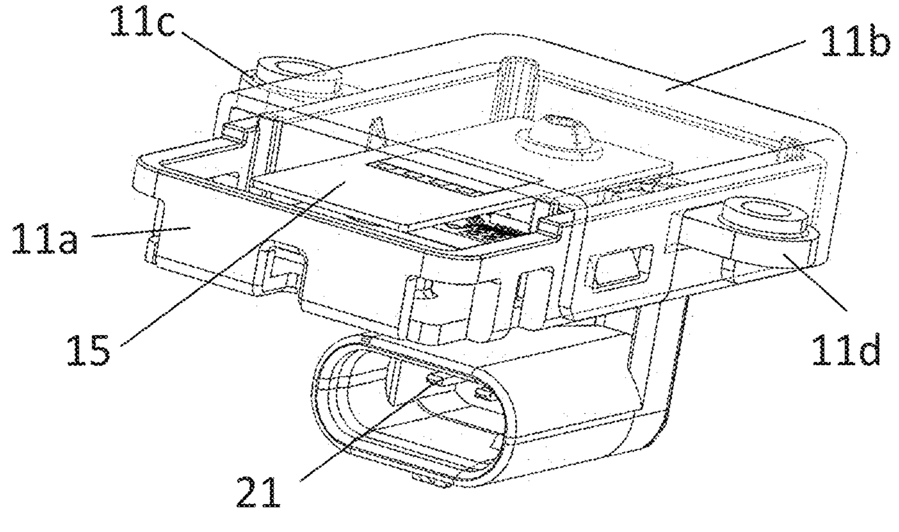
FIG. 3 is a second perspective view of a housing of the vehicle door assembly of FIG. 1.
Figure 4:
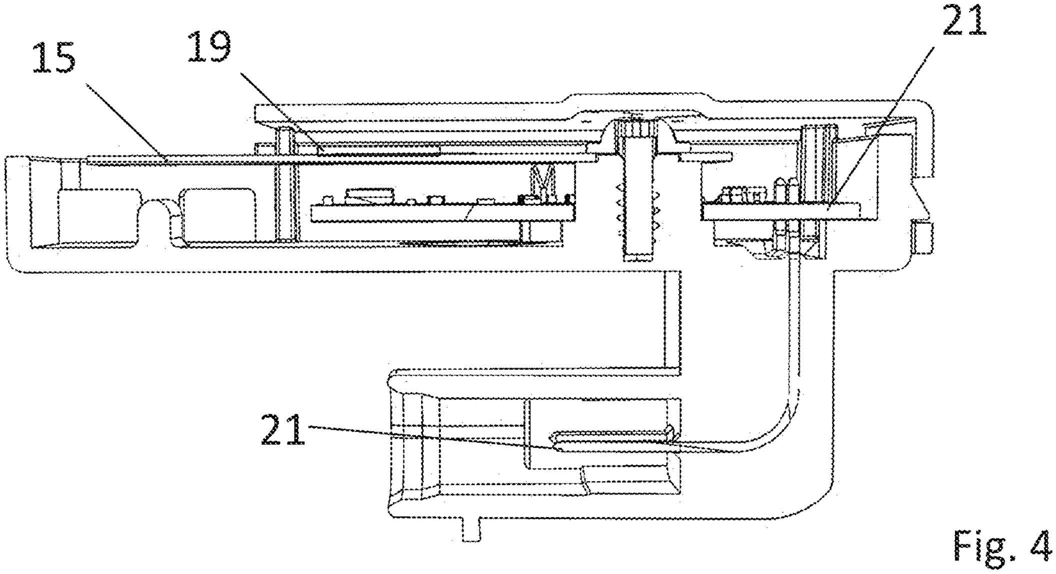
FIG. 4 is a perspective and cut view of a housing of the vehicle door assembly of FIG. 1.

The vehicle door opening assembly 10 comprises a housing 11 more visible in FIGS. 2 to 4. The housing 11 may have a cuboid general shape. The housing 11 is a hollow housing providing a recess 12 with an opening 13 on one side of the housing 11, for example on one of the larger faces of the housing 11. Preferably, a potting resin is injected into the recess 12 to protect and seal the internal components and electrical connections. The potting resin can surround all internal components, which are located inside the recess 12, except the plate 15. Especially preferably, the potting resin surrounds all internal components except the second end 15*b* of the plate 15.

The housing 11 may be made of a first part 11*a* and a second part 11*b* clipped together.

The vehicle door assembly 10 also comprises an elastic lever such as a plate 15 arranged in the recess 12. The plate 15 is for example a metallic plate, for example a steel plate. Other types of elastic lever or other materials such as plastic material may also be used. The plate 15 has a first end 15*a* embedded in the housing 11, for example via a screw 17. The second end 15*b* is a free end which extends in front of the opening 13.

The vehicle door assembly 10 also comprises a sensor 14 configured for detecting a deformation of the elastic lever, here the plate 15, or a displacement of the free end 15*b* of the elastic lever 15. In the present example, the sensor 14 comprises strain gauges 19 arranged on the plate 15, for example in a middle part 15*c* located between the first end 15*a* and the second end 15*b*. The sensor 14 may comprise a printed card board 16. The sensor 14 may comprise a Wheatstone bridge with the strain gauges 19 positioned in the different legs of the Wheatstone bridge. The strain gauges 19 are configured to detect a deformation of the plate 15 when the free end 15*b* of the plate 15 is displaced. The strain gauges 19 may be positioned on both sides of the plate 15. Thermal compensation may be applied on the strain gauges 19.

Alternatively, the sensor 14 may be a capacitive sensor, an inductive sensor or a piezoelectric sensor configured for detecting a displacement of the free end 15*b* of the plate 15.

A connector 21 may also be arranged on the housing 11. The connector 21 may be connected to the printed card board 16. The connector 21 enables supplying power to the sensor 14, the Wheatstone bridge in the present case, and transmitting the detection signal to a central controller to open the trunk.

Figure 6:
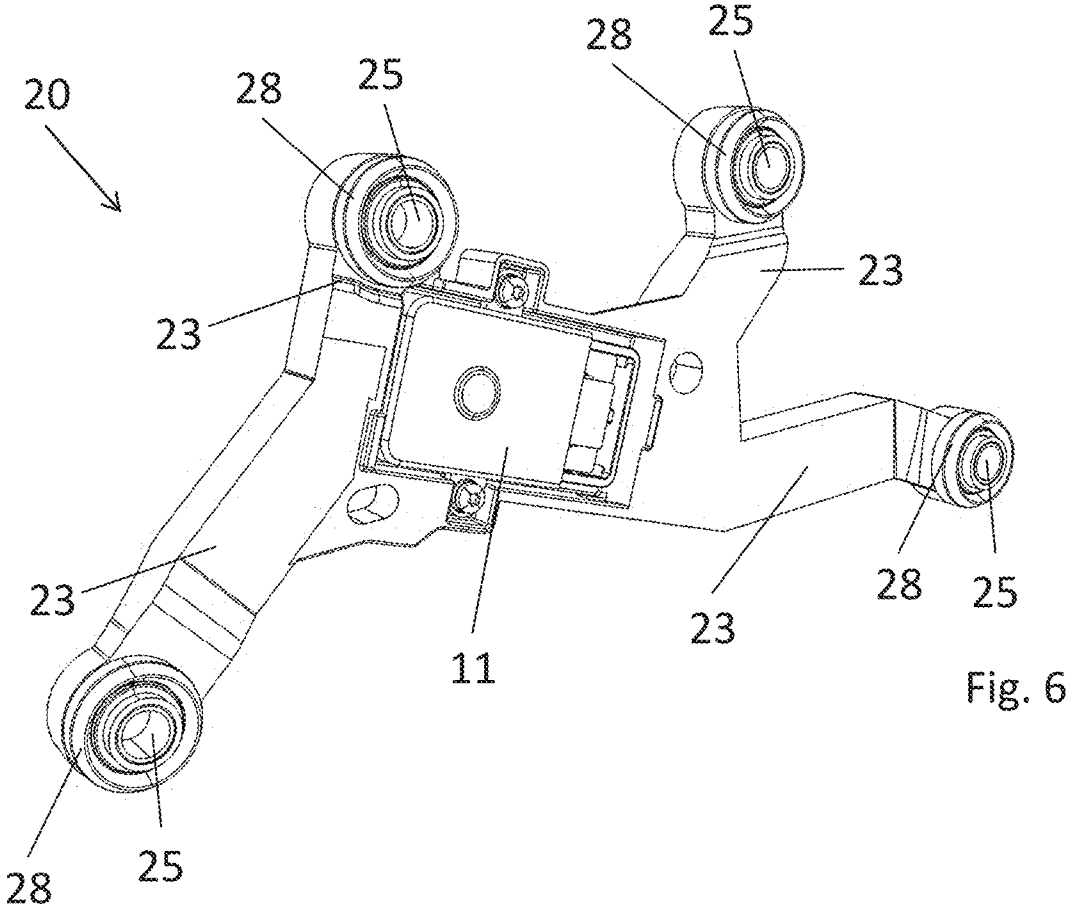
FIGS. 6 and 7 are perspective views of a housing and a fixing frame of the vehicle door assembly of FIG. 1.
Figure 7:
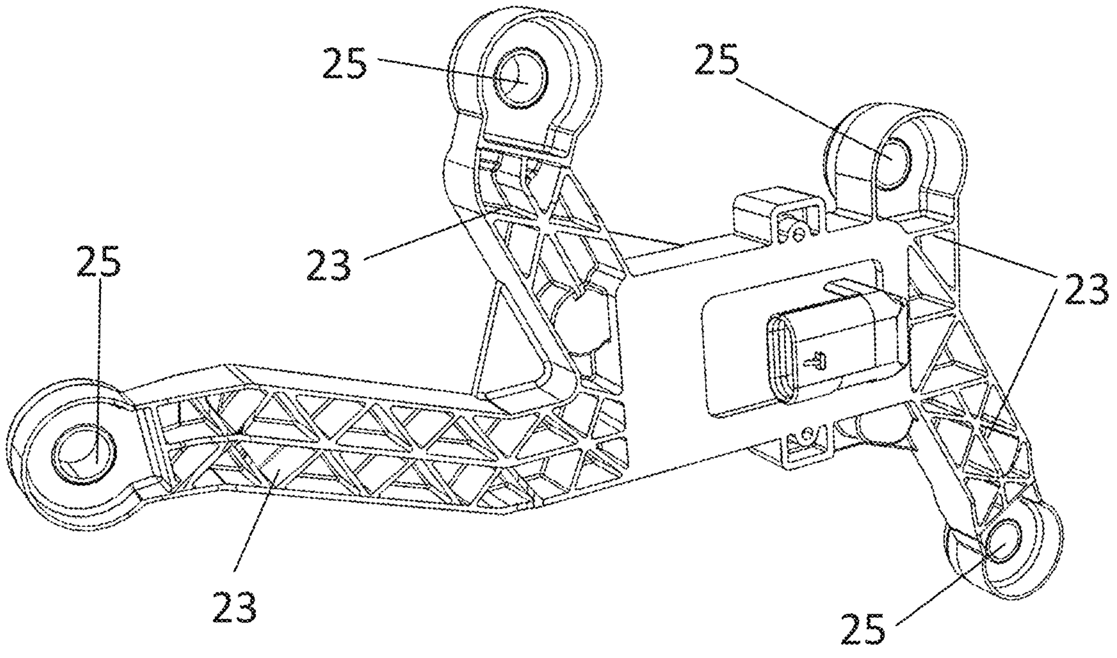
Figure 8:
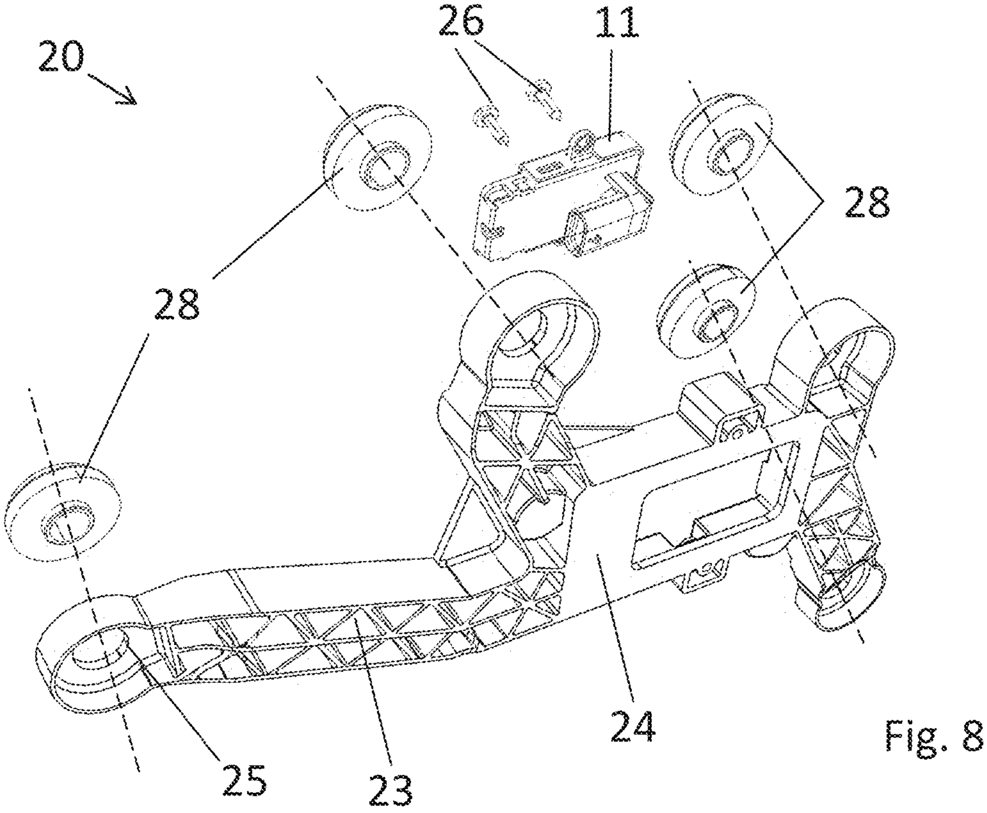
FIGS. 8 and 9 are exploded views of a housing and a fixing frame of the vehicle door assembly of FIG. 1.
Figure 9:
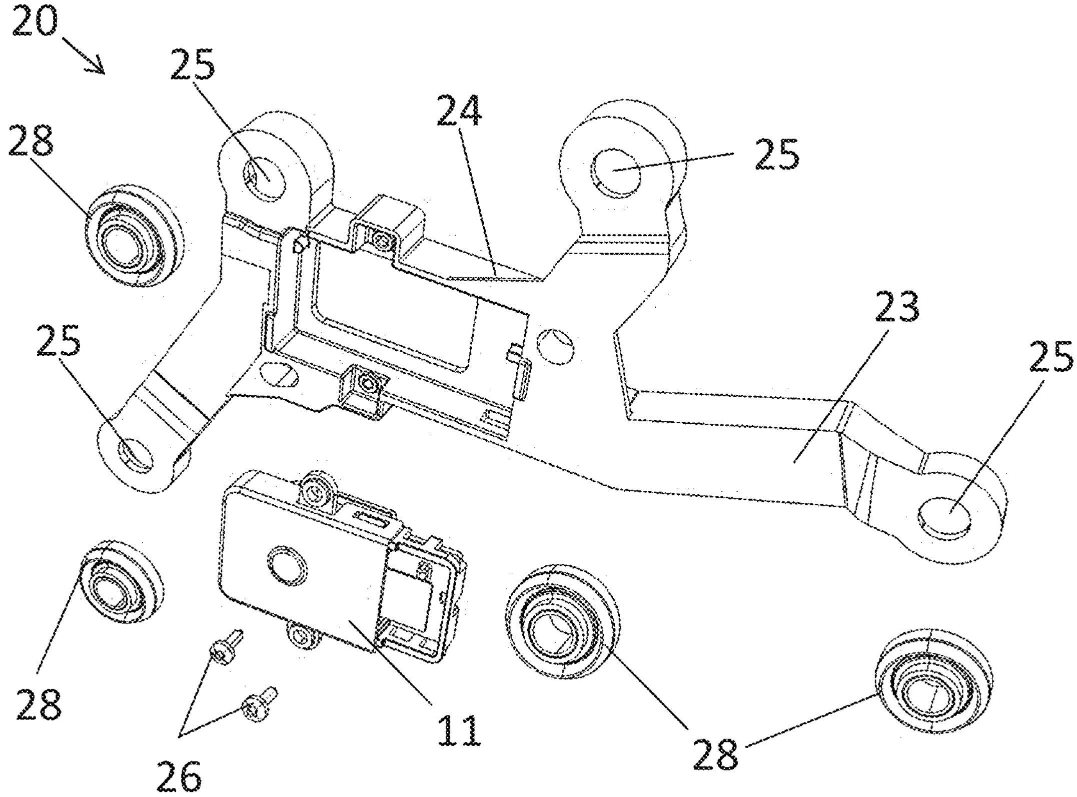

The vehicle door opening assembly 10 also comprises fixing means 20 configured to be fastened to an inner side of the door panel 3. The fixing means 20 may be arranged around the housing 11. As represented in FIGS. 6 and 7, the fixing means 20 may comprise legs 23 extending around the housing 11, for example four legs 23 distributed at the four corners of the housing 11. The legs 23 comprises holes 25 at their extremity for receiving screws 7 and possibly clastic elements 28 such as dampers made of elastomer or other damping material (the screws 7 are therefore used to fasten both the legs 23 and the cover 5. Alternatively different fastening means or fixing means may be used for the cover 5 and for the legs 23). As represented in FIGS. 8 and 9, the legs 23 may be gathered in a single part forming a bracket and comprising a central frame 24 configured for receiving the housing 11. The housing 11 may comprise two opposite lateral arms 11*c* and 11*d* comprising a hole at their ends. The housing 11 may then be fastened to the frame 24 by screws 26 positioned in the holes of the arms 11*c*, 11*d*. Other types or shapes of fixing means 20 may also be used.

Figure 5:
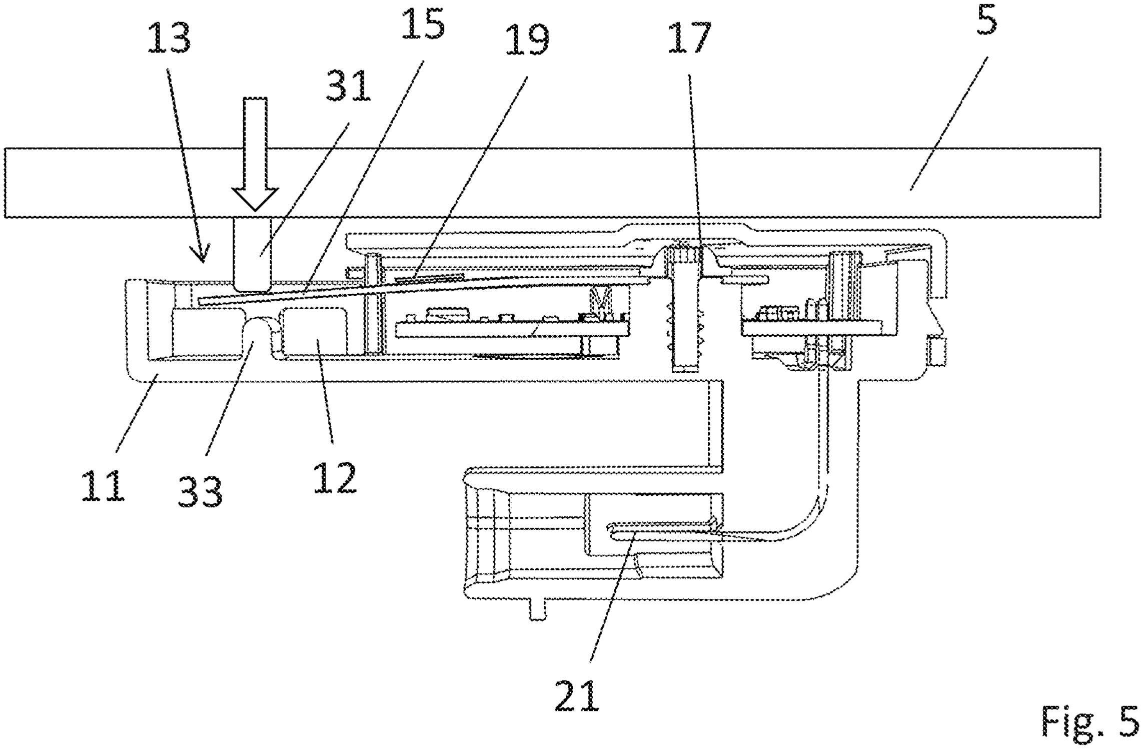
FIG. 5 is a side and cut view of a housing of the vehicle door assembly of FIG. 1.

The cover 5 comprises a pin 31 (visible in FIGS. 1 and 5) located on the inner side of the cover 5 and configured to protrude within the opening 13 of the housing 11 to come into contact with the second free end 15*b* of the plate 15. The cover 5 and the housing 11 may be configured so that the plate 15 is preloaded or prestressed by the pin 31 when no pressure is applied on the opening actuation are, here the cover 5. The housing 11 may comprise a stopper 33 located in front of the pin 31 to limit the flexion of the plate 15 in its clastic flexion zone. The stroke of the second free end 15*b* can be, for example, of a few tenths, up to a few millimetres.

The cover 5 is arranged so that a pressure on the cover 5 by a user from the outside as represented by the arrow 6 in FIG. 1 leads to the compression of the elastic elements 28 allowing therefore a displacement of the cover 5 with respect to the door panel 3 and with respect to the housing 11. The pin 31 located on the inner side of the cover 5 is also displaced which leads to the displacement of the second free end 15*b* of the plate 15 as the pin 3 is in contact with the plate 15. The displacement of the second free end 15*b* of the plate 15 corresponds to a bending of the plate 15 so that the strain gauges 19 are distorted. Such distortion of the strain gauges 19 leads to a change of their resistance in the Wheatstone bridge. Such change of resistance leads to a change of the output voltage of the Wheatstone bridge. This change of output voltage leads to the transmission of an opening electrical signal to open the trunk 2. In the same way with other sensors configured for detecting a displacement of the second free end 15*b* of the plate 15, a displacement of the cover 5 leads to the transmission of an opening electrical signal to open the trunk.

Thus, a vehicle door opening assembly 10 according to the embodiments of the present invention enable an opening of the vehicle door 2, for example the trunk by a pressure of the user on an opening actuation area. The opening actuation area may be defined by a brand logo in order for the vehicle door opening assembly 10 to be hidden behind the brand logo. The opening actuation area is therefore integrated in the design of the brand logo so that no command button appears to the user's vision. Furthermore, no specific design of the vehicle door to implement such opening actuation area is necessary.

The invention claimed is:

1. A vehicle door opening assembly, comprising:
a housing providing a recess with an opening;
an elastic lever arranged in the recess, having a first end embedded in the housing and a second free end extending in front of the opening;
a sensor configured to detect a deformation of the elastic lever or a displacement of the second free end of the elastic lever; and
fixing means arranged around the housing and configured to be fastened to an inner side of a vehicle door panel,
wherein the second end of the elastic lever is configured to be in contact with a pin attached to the inner side of the vehicle door panel in front of an outer side location associated with an opening actuation area so that a pressure applied on the opening actuation area leads to a displacement of the second end of the elastic lever which can be detected by the sensor, and
wherein the fixing means comprise elastic parts configured to be compressed when the pressure is applied to the opening actuation area.

2. The vehicle door opening assembly in accordance with claim 1, wherein the vehicle door panel is a trunk door panel or a trunk lid panel.

3. The vehicle door opening assembly in accordance with claim 1, wherein the elastic lever is a metallic plate.

4. The vehicle door opening assembly in accordance with claim 1, wherein the sensor comprises at least one strain gauge arranged on the elastic lever and configured to be deformed when the second free end of the elastic lever is displaced.

5. The vehicle door opening assembly in accordance with claim 1, wherein the sensor comprises a capacitive, inductive or piezoelectric sensor configured to detect a displacement of the second free end of the elastic lever.

6. The vehicle door opening assembly in accordance with claim 1, wherein the fixing means are arranged on a bracket comprising a central frame configured to receive the housing and a plurality of legs extending around the central frame.

7. The vehicle door opening assembly in accordance with claim 6, wherein the plurality of legs includes four legs distributed at four corners of the housing.

8. The vehicle door opening assembly in accordance with claim 7, wherein each of the four legs includes a hole configured to receive a screw.

9. A vehicle door comprising:
the vehicle door opening assembly according to claim 1; and
the pin arranged on the inner side of the vehicle door panel,
wherein the elastic lever is configured to be preloaded by the pin.

10. The vehicle door in accordance with claim 9, further comprising the vehicle door panel, an opening arranged in the vehicle door panel, and a cover fastened to the vehicle door panel configured to cover the opening,
wherein the fixing means are fastened to an inner side of the said vehicle door panel, the cover corresponding to the opening actuation area.

11. The vehicle door in accordance with claim 10, wherein the cover is a brand logo.

12. The vehicle door in accordance with claim 10, wherein elastic means are combined with the fixing means to allow a displacement of the cover with respect to the vehicle door panel.

13. The vehicle door in accordance with claim 10, wherein the cover is made of an elastic material that is different than a material of the vehicle door panel.

* * * * *